Patented May 8, 1934

UNITED STATES PATENT OFFICE 1,957,876

PROCESS FOR THE TREATMENT OF SUGAR JUICES

Paul Wuidart, Paris, France, assignor to Societe Industrielle Et Agricole De La Somme, Paris, France No Drawing. Application September 29, 1932, Serial No. 635,461. In France November 12, 1931

3 Claims. (Cl. 127—48)

This invention refers to a treatment of sugar juices, the object of which is to promote their precipitation and filtration, whilst rendering easier and more economical and efficient the subsequent treatment of these juices by the usual methods.

The substances to be precipitated are contained in the sugar juices in a colloidal state, that is to say in the state of particles, the dimensions of which vary between 1 to 200 micro-millimetres.

It is known that colloids are electrically charged and that the charges of the same are either positive or negative. In the same colloidal solution all the particles—in other words all the ions which are charged with electricity of the same sign—mutually repel one another, and it is to this phenomenon that the impossibility of forming any precipitation is attributed, the result being the difficulty observed in filtration.

In order to solve this difficulty it is necessary to seek some means to neutralize the charge of the ions. This result is obtained by adding to the ions in the colloidal solution, as many ions charged with electricity of the opposite sign.

The object of the invention is the preparation and method of application of a colloidal product suitable for realizing the object in view under particularly advantageous conditions.

The colloidal product in question which is added, after diffusion or treatment at the mills, to the raw sugar juices (beet or cane) causes the formation of an isoelectric medium which promotes the formation of a precipitate easy to separate.

The process according to this invention is based on the application of a colloidal solution of alumina.

A product rich in alumina is treated in such manner as to obtain alumina in a colloidal form, for instance by treating in the known manner a salt of aluminium such as chloride or sulphate of aluminium with, for example, ammonia.

After it has been washed with water a current of $SO_2$ is passed through the colloidal mass which is then in a hydrogel state. This reactive agent produces upon the hydrogel an effect known by the name of peptization, which converts the hydrogel into a solution or hydrosol. This peptization may also be obtained by other means.

The alumina in the hydrogel condition may be used as such for the purpose of obtaining the neutralization of the electric ions in the sugar juices. It has been found however that its efficaciousness is increased by following up the treatment with sulphurous acid by an addition of colloidal silica and formic aldehyde, even if used in small quantities.

As a guidance the following composition for the liquor required may be given:

| | Percent |
|---|---|
| Alumina | 10 |
| Silica | 5 |
| Formaldehyde | 25 |
| Water | 60 |

The preparation must be perfectly homogeneous.

The juice is treated with this solution in the proportion of 450 to 700 grammes per hectolitre.

The filtration which follows is easy.

A purified and decoloured juice is then obtained the further treatment of which is greatly simplified.

The lime required afterwards may be reduced to from 60 to 65%.

The products under manufacture are purer and the boiled material is drier, whilst viscosity is greatly reduced.

It should be observed that the deposits filtered during the first filtration constitute a fertilizer which is rich in organic nitrogen.

As its base is alumina, it has a pronounced influence on the chlorophyllian condition of plants, which itself influences the production of saccharose and protection from microbian diseases.

It is understood that the numerical data above specified need not be strictly complied with and any slight deviation in the dosage of the various elements will not constitute any departure from the invention.

What is claimed is:

1. Process of the treatment of sugar juices, consisting in subjecting the same to a reagent containing together a hydrosol of colloidal alumina, colloidal silica and formicaldehyde and used in a proportion smaller than 700 gr. per hectoliter of sugar juice.

2. Process according to claim 1, consisting in treating the sugar juices with hydrosol of colloidal alumina about 10% obtained by subjecting to the action of sulphurous acid a hydrogel of alumina and then adding in the approximate proportions colloidal silica 5% and formicaldehyde 25%.

3. Process according to claim 1, consisting in subjecting the sugar juices to the action of a reagent of approximately 10% colloidal alumina, 5% colloidal silica, 25% formaldehyde with 60% water, used in the proportion of from 450 to 700 grammes per hectolitre of sugar juice and then filtering the precipitate formed, thereby obtaining a purified and decolored juice and saving about 60% in the consumption of lime in subsequent treatments.

PAUL WUIDART.